United States Patent
Hert et al.

(10) Patent No.: US 8,410,216 B2
(45) Date of Patent: Apr. 2, 2013

(54) IMPACT-RESISTANT COMPOSITION BASED ON A POLYAMIDE RESIN AND ON A BLEND OF AT LEAST ONE GRAFT COPOLYMER WITH POLYAMIDE BLOCKS AND A LOW-DENSITY ETHYLENE POLYMER

(75) Inventors: Marius Hert, Epfig (FR); Alain Bouilloux, Saint-Leger de Rotes (FR); Thibaut Montanari, Menneval (FR); Thomas Fine, Lyons (FR)

(73) Assignee: Arkema France, Colombes (FR)

( * ) Notice: Subject to any disclaimer, the term of this patent is extended or adjusted under 35 U.S.C. 154(b) by 58 days.

(21) Appl. No.: 12/445,082

(22) PCT Filed: Oct. 11, 2007

(86) PCT No.: PCT/FR2007/052118
§ 371 (c)(1),
(2), (4) Date: Dec. 17, 2009

(87) PCT Pub. No.: WO2008/043958
PCT Pub. Date: Apr. 17, 2008

(65) Prior Publication Data
US 2010/0137516 A1    Jun. 3, 2010

(30) Foreign Application Priority Data
Oct. 12, 2006 (FR) ..................... 06 54250

(51) Int. Cl.
*C08L 77/02* (2006.01)
*C08L 77/06* (2006.01)

(52) U.S. Cl. .......... 525/66; 525/178; 525/179; 525/183; 525/184; 525/432

(58) Field of Classification Search ............ 525/66, 525/178, 179, 183, 184, 432
See application file for complete search history.

(56) References Cited

U.S. PATENT DOCUMENTS

| | | | |
|---|---|---|---|
| 3,963,799 A * | 6/1976 | Starkweather, Jr. | 525/69 |
| 6,376,037 B1 | 4/2002 | Montanari et al. | |
| 2003/0199635 A1 | 10/2003 | Court et al. | |

* cited by examiner

*Primary Examiner* — Ana Woodward
(74) *Attorney, Agent, or Firm* — Buchanan Ingersoll & Rooney

(57) ABSTRACT

The invention relates to a composition based on an impact-resistant thermoplastic polyamide resin, comprising, as a blend—from 60 to 98 wt % of polyamide resin (A) and—from 2 to 40 wt % of a blend of at least one graft copolymer with polyamide blocks (B) composed of a polyolefin backbone and at least one polyamide graft in which the grafts are attached to the backbone by the residues of an unsaturated monomer (X) having a functional group capable of reacting with an amine-terminated polyamide, the residues of the unsaturated monomer (X) being attached to the backbone by grafting or copolymerization via its double bond, and of a non-reactive ethylenic polymer (C) that is miscible with (B) and has a density of below 0.960 g/cm$^3$.

12 Claims, No Drawings excellence of the ratio of the impact strength of the composition to that of the thermoplastic polymer alone.

IMPACT-RESISTANT COMPOSITION BASED ON A POLYAMIDE RESIN AND ON A BLEND OF AT LEAST ONE GRAFT COPOLYMER WITH POLYAMIDE BLOCKS AND A LOW-DENSITY ETHYLENE POLYMER

This application claims benefit, under U.S.C. §119 or §365 of French Application Number FR 0654250, filed Oct. 12, 2006; and PCT/FR2007/052118 filed Oct. 11, 2007.

FIELD OF THE INVENTION

The present invention relates to a composition based on a polyamide thermoplastic to resin and on a blend of at least one olefinic polyamide-block graft copolymer and of a low density ethylenic polymer, that is impact resistant while having a satisfactory melt flow.

BACKGROUND OF THE INVENTION

The improvement in the impact strengths of polyamides is generally obtained by incorporation, in the form of a dispersed phase, of an impact modifier which is elastomeric in nature and has reactive functional groups (acrylic acid, maleic anhydride, etc.) capable of reacting with the functional groups, such as the $NH_2$ chain ends, of the polyamide matrix. This reactivity makes it possible to ensure a fine homogeneous dispersion of the elastomer by controlling the size of its particles or nodules, a good adhesion at the nodule/matrix interface, and to obtain an optimum increase in the impact strength. However, the drawback of this technique is the thickening of the blend, due to the PA-impact modifier coupling, which leads to a significant fall in the melt flow. This large change in the viscosity is detrimental to the processing of such compositions, especially for thin or large-sized injection-moulded parts and also an extrusion.

Descriptions have already been given in the prior art of numerous polyamide-based impact-resistant compositions.

EP 96 264 describes polyamides with a relative viscosity of between 2.5 and 5 that are reinforced by ethylene/$C_2$ to $C_8$ alkyl (meth)acrylate/unsaturated acid or anhydride copolymers and comprising 20 to 40% by weight of acrylate.

EP 2 761 describes polyamides reinforced by polyethylenes or copolymers of ethylene grafted with (meth)acrylic acid, its derivatives or maleic anhydride and optionally polyethylene.

EP 52 796 describes polyamides reinforced by (i) an α-olefin/unsaturated carboxylic acid copolymer, (ii) an α-olefin/alkyl ester of an unsaturated carboxylic acid copolymer and (iii) a metal compound.

FR 2 292 016 describes polyamides reinforced by a blend of copolymers of α-olefins and of esters of unsaturated carboxylic acids or their derivatives.

U.S. Pat. No. 5,070,145 describes polyamides reinforced by a blend (i) of a polyethylene or of an ethylene/alkyl (meth) acrylate copolymer and (ii) of an ethylene/alkyl (meth)acrylate/maleic anhydride copolymer.

U.S. Pat. No. 4,174,358 describes reinforced polyamides that are in the form of a polyamide matrix dispersed in which are nodules having a size between 0.01 and 1 μm, having a modulus between 0.007 and 138 MPa, the ratio of the modulus of the PA matrix to that of the impact modifier having to be at least equal to 10. A great many reinforcing agents are described, some having epoxide functional groups (but no examples are given), most are polymers having neutralized anhydride or acid functional groups or are mixtures based on EPDM. All these reinforcing agents are presented as equivalent.

This entire prior art gives examples only of reinforcing agents having acid or acid anhydride functional groups or EPDM, and no mention is made of the viscosity of the reinforced polyamides. It will be seen in the comparative examples of the present invention that the behaviour of the modifiers of the prior art has no connection with that of the modifiers of the present invention.

EP 802 226 by the Applicant describes injection-moulded parts based on polyamide resin (A) and on an amount of a copolymer (B) of ethylene and of an unsaturated epoxide such that their melt flow index is greater than the ratio of the melt flow index of the polyamide (A) divided by 0.175 times the weight percentage of the copolymer (B).

EP 821 037 by the Applicant describes compositions comprising at least one polyamide (A) and at least one copolymer (B) of ethylene and of at least one unsaturated carboxylic acid anhydride (or acid), the amount of which is between 0.1 and 0.5% by weight, such that the impact/flow index (IF) of the compositions comprising 90 parts of (A) per 10 parts of (B) is greater than 1.5, these compositions containing essentially no glass fibres. These documents do not describe the use of impact modifiers as a mixture with low density polyethylenes.

EP 564 338 describes polyamides reinforced (i) by ethylene/alkyl (meth)acrylate/glycidyl methacrylate copolymers and (ii) optionally by polyethylenes, ethylene/alkyl (meth) acrylate copolymers or ethylene/alkyl (meth)acrylate/unsaturated dicarboxylic acid anhydride copolymers. This prior art is only interested in the impact strength and not in the viscosity. It is clear (from the table of examples) that it is advantageous to mix a reinforcing agent having epoxide functional groups with a reinforcing agent having anhydride functional groups in order to cause crosslinking of the dispersed phase, which gives significant impact strength but to the detriment of the viscosity.

WO 94/25526 describes a composition comprising a homogeneous blend of at least one thermoplastic polymer, of polyester or polyamide type, and a copolymer of substantially linear ethylene, obtained by metallocene catalysis, having a density greater than 0.850 g/cm$^3$, grafted with at least 0.01% by weight of a maleic anhydride type unsaturated compound. The optimum degree of grafting is between 0.05 and 10% by weight.

The linear polyethylene contains from 95 to 50% by weight of ethylene and from 5 to 50% by weight of $C_3$ to $C_{20}$ comonomer, in particular of 1-octene, with densities ranging from 0.860 to 0.935 g/cm$^3$. Blends of PA-6,6 and of the grafted ethylene copolymer, at contents between 20 and 35% by weight of the blend, are exemplified and make it possible to improve its impact strength. No supplementary compatibilizer is used.

U.S. Pat. No. 6,303,688 describes a composition containing:
a) from 5 to 50% of:
  i) 10 to 70% of a copolymer of ethylene and of $C_3$ to $C_{18}$ α-olefins, of the metallocene type, grafted between 0.1 and 10% by an unsaturated carboxylic acid or its anhydride;
  ii) 90 to 30% of an elastomeric copolymer of ethylene and of $C_3$ to $C_8$ α-olefins (in particular an EPR, EPDM, or SBS), and optionally of an unconjugated diene;
b) from 95 to 50% of a thermoplastic polymer such as: PA, polyesters, polyacetals, polycarbonate; this composition has improved impact resistance properties, relative to the preceding document, by virtue of the use, as an impact modifier, of a blend of a grafted ethylene copolymer and of an ungrafted elastomer. No supplementary compatibilizer is used.

U.S. Pat. No. 3,963,799 describes a blend comprising from 60 to 90 parts of polyamide and from 40 to 10 parts of polyethylene (including high density polyethylene), introduced into which are 1.8 to 8 parts of a PA-block graft copolymer made from a backbone composed of a copolymer of ethylene and of a comonomer of the maleic anhydride type, which acts as a compatibilizer making it possible to disperse the polyethylene as nodules having a diameter between 0.2 and 1 µm. No indication on the viscosities of the blends obtained is given.

Document WO 02/28959 by the Applicant describes a polyamide-block graft copolymer in a polyolefin backbone which is chosen from ethylene/maleic anhydride and ethylene/alkyl (meth)acrylate/maleic anhydride copolymers, forming a nanostructured cocontinuous blend, which gives this copolymer excellent thermomechanical properties that are retained when redispersing this graft copolymer in flexible polyolefins such as flexible ethylene polymers.

Blends of this kind find applications as adhesives, films, tarpaulins, calendered products, electrical cables or powders for moulding processes ("slush-moulding").

The Applicant surprisingly has discovered, that by combining, as a blend, this type of graft copolymer with at least one miscible non-reactive olefinic polymer, in large proportions, an impact-modifying compound was obtained, which when introduced into a polyamide-based composition, made it possible to obtain both an improved impact strength and a good melt flow allowing, in particular these compositions to be injection-moulded for producing various types of parts, or to be extruded.

This is especially the case for thin or larger-sized parts or alternatively parts with a complicated shape, these parts having to be produced at industrial output rates.

Generally, the impact properties of a polyamide are improved by the addition of a dispersed phase of an impact modifier which contains reactive functional groups (acrylic acid, maleic anhydride, etc.). The impact modifier used in our invention (blend of a graft copolymer with a non-reactive olefinic polymer) does not contain reactive functional groups. However, surprisingly, this modifier makes it possible to obtain a polyamide-based composition having excellent impact properties, in particular at low temperature. These low temperature properties are particularly sought after, for example in the automotive field where external parts made of polyamide (wing mirrors, etc.) must retain their impact properties whatever the outside conditions.

Furthermore, the use of an impact modifier generally leads to significant thickening of the composition. However, in the case of the impact modifier used in our invention, the composition remains more fluid than for other impact modifiers.

Without wanting to be tied to one theory in particular, it appears that the compatibilization takes place via miscibility of the PA grafts of the graft copolymer with the PA chains of the matrix, the anchoring of the elastomeric nodules being thermodynamic.

The advantage of the compositions of the invention is the compromise between the impact strength and the viscosity: these compositions combine excellent impact behaviour and a much higher melt flow of the polyamide-based formulations in comparison to the impact modifiers generally used.

Another optional advantage is that it is possible to add a single product to the polyamide resin and not a mixture of various products.

Another advantage is that it is sufficient to add the PA grafted ethylene copolymer into the extruder which feeds the injection-moulding device. This addition can be made via a side extruder or a granule metering device on the polyamide extruder. It is therefore not necessary to prepare the blend of the polyamide resin and of the impact reinforcing agent in advance.

DESCRIPTION OF THE INVENTION

The present invention relates therefore to a composition based on an impact-resistant polyamide thermoplastic resin, comprising, as a blend:
from 60 to 98% by weight of polyamide resin (A) and
from 2 to 40% by weight of a blend of at least one polyamide-block graft copolymer (B) composed of a polyolefin backbone and of at least one polyamide graft in which the grafts are attached to the backbone by the residues of an unsaturated monomer (X) having a functional group capable of reacting with an amine-terminated polyamide, the residues of the unsaturated monomer (X) being attached to the backbone by grafting or copolymerization via its double bond, and of a non-reactive ethylenic polymer (C) that is miscible with (B) and has a low density, the density being less than 0.960 g/cm$^3$.

In particular, in the composition according to the invention, the percentage by weight of the copolymer (B) in the blend between the copolymers (B) and (C) is between 10 and 99%.

Preferably, the polyolefin backbone containing X of the copolymer (B) is chosen from ethylene/maleic anhydride and ethylene/alkyl (meth)acrylate/maleic anhydride copolymers.

Preferably, the polyamide grafts of the copolymer (B) are mono-NH$_2$-terminated PA-6 polyamide or mono-NH$_2$-terminated PA-11 polyamide or mono-NH$_2$-terminated PA-6/11 copolyamide.

In particular they have a molar mass between 1000 and 5000 g/mol and preferably between 2000 and 4000 g/mol.

The copolymer (B) is advantageously an ethylene/alkyl (meth)acrylate/maleic anhydride copolymer with mono-NH$_2$-terminated PA grafts.

Preferably, in the composition according to the invention, the ethylenic polymer (C) has a density of less than 0.915 g/cm$^3$. More preferably, it is chosen from linear low density polyethylene (LLDPE), very low density polyethylene (VLDPE), polyethylene obtained by metallocene catalysis (mPE), such as in particular the ethylene/1-octene copolymer, ethylene-propylene-rubber (EPR) elastomers, ethylene-propylene-diene monomer (EPDM) elastomers, ethylene/alkyl (meth)acrylate copolymers possibly containing up to 60% by weight of (meth)acrylate and preferably 2 to 40%, ethylene/vinylacetate copolymers.

Preferably, these polymers have a density of less than 0.870 g/cm$^3$.

Various methods may be used for producing this composition:
1) addition of the polyamide block graft copolymer (B) (already produced elsewhere, as described below) into the polyamide PA resin matrix, in particular in an extruder, then addition of the ethylenic polymer (C),
2) introduction of the polyamide block graft copolymer (B) (already produced elsewhere), of the non-reactive ethylenic polymer (C) (PE for example) and of the PA resin, into an extruder, and compounding of the blend,
3) manufacture of the polyamide block graft copolymer (B) in situ in the non-reactive ethylenic polymer (C) (in particular PE), by blending a functionalized polyolefin (for example functionalized with maleic anhydride—MAH), mono- NH₂-terminated PA and PE in an extruder; the product of this blending then being the impact modifier that is added directly to the PA resin matrix subsequently; and 4) manufacture of the polyamide block graft copolymer (B) in the PA resin composition, then addition of the non-reactive polymer (C).

The invention also relates to the use of these compositions, for the manufacture of products or parts obtained by injection-moulding or by extrusion.

The term "polyamide" is understood to mean the condensation products:

- of one or more amino acids, such as aminocaproic, 7-aminoheptanoic, 11-aminoundecanoic and 12-aminododecanoic acids or of one or more lactams such as caprolactam, oenantholactam and lauryllactam;
- of one or more salts or mixtures of diamines such as hexamethylenediamine, nonamethylenediamine, decamethylenediamine (or 1,10-decanediamine), dodecamethylenediamine, meta-xylylenediamine, bis(p-aminocyclohexyl)methane and trimethylhexamethylenediamine, with diacids such as isophthalic, terephthalic, adipic, azelaic, suberic, sebacic and dodecanedicarboxylic acids,
- or mixtures of some of these monomers which leads to the copolyamides.

For example, the condensation of caprolactam and of lauryllactam produces PA-6/12. The invention advantageously relates to PA-6 (polycaprolactam), PA-6,6 (polyhexamethyleneadipamide), PA-11 or poly(1'-aminoundecanoamide), PA-12 (polylauryllactam) and PA-6/12. It is more particularly useful for PA-6 and PA-6,6.

The main constituent of the impact modifying compound for the composition based on a polyamide thermoplastic resin, which is the subject of the present invention, will be described in greater detail.

Regarding the polyamide-block graft copolymer, it may be obtained by reaction of an amine-terminated polyamide with the residues of an unsaturated monomer X attached by grafting or copolymerization to a polyolefin backbone.

This monomer X may be, for example, an unsaturated epoxide or an unsaturated carboxylic acid anhydride. The unsaturated carboxylic acid anhydride may be chosen, for example, from maleic, itaconic, citraconic, allyl succinic, 1,2-cyclohex-4-enedicarboxylic, 4-methylene-1,2-cyclohex-4-enedicarboxylic, bicyclo[2.2.1]hept-5-ene-2,3-dicarboxylic and x-methylbicyclo[2.2.1]hept-5-ene-2,2-dicarboxylic anhydrides. Advantageously maleic anhydride is used. It would not be outside the scope of the invention to replace all or some of the anhydride with an unsaturated carboxylic acid such as, for example, (meth)acrylic acid. Examples of unsaturated epoxides have been mentioned above.

Regarding the polyolefin backbone, a polyolefin is defined as a homopolymer or copolymer of α-olefins or diolefins, such as for example ethylene, propylene, 1-butene, 1-octene or butadiene. By way of example, mention may be made of

- homopolymers and copolymers of polyethylene, in particular LDPE, HDPE, LLDPE (linear low density polyethylene), VLDPE (very low density polyethylene) and metallocene polyethylene;
- homopolymers or copolymers of propylene;
- ethylene/α-olefin copolymers such as ethylene/propylene copolymers, EPRs (ethylene-propylene rubber) and ethylene-propylene-diene monomer (EPDM) copolymers;
- styrene/ethylene-butene/styrene (SEBS), styrene/butadiene/styrene (SBS), styrene/isoprene/styrene (SIS) and styrene/ethylene-propylene/styrene (SEPS) block copolymers; and
- copolymers of ethylene with at least one product chosen from salts or esters of unsaturated carboxylic acids such as alkyl (meth)acrylate (for example methyl acrylate), or vinyl esters of saturated carboxylic acids such as vinyl acetate, the amount of comonomer possibly reaching 40% by weight.

Advantageously, the polyolefin backbones onto which the X residues are attached are polyethylenes grafted by X or copolymers of ethylene and X that are obtained, for example, by radical polymerization.

Regarding the polyethylenes onto which X will be grafted, polyethylene is understood to mean ethylene homopolymers or copolymers.

As comonomers, mention may be made of:

- α-olefins, advantageously those having from 3 to 30 carbon atoms. Examples have been mentioned above. These α-olefins may be used alone or as a blend of two or more than two;
- esters of unsaturated carboxylic acids such as for example alkyl (meth)acrylates, the alkyl groups possibly having up to 24 carbon atoms, examples of alkyl acrylates or methacrylates are especially methyl methacrylate, ethyl acrylate, n-butyl acrylate, isobutyl acrylate and 2-ethylhexyl acrylate;
- vinyl esters of saturated carboxylic acids such as for example vinyl acetate or vinyl propionate;
- dienes, such as for example 1,4-hexadiene; and
- the polyethylene may comprise several of the preceding comonomers.

Advantageously, the polyethylene, which may be a blend of several polymers, comprises at least 50% and preferably 75% (in moles) of ethylene, its density may be between 0.86 and 0.98 g/cm³. The MFI (melt flow index at 190° C./2.16 kg) is advantageously between 20 and 1000 g/10 min.

As examples of polyethylenes, mention may be made of low density polyethylene (LDPE);
high density polyethylene (HDPE);
linear low density polyethylene (LLDPE);
very low density polyethylene (VLDPE);
polyethylene obtained by metallocene catalysis;
EPR (ethylene-propylene rubber) elastomers;
EPDM (ethylene-propylene-diene monomer) elastomers;
blends of polyethylene with an EPR or an EPDM; and
ethylene/alkyl (meth)acrylate copolymers possibly containing up to 60% by weight of (meth)acrylate and preferably 2 to 40%.

Grafting is an operation known per se.

Regarding the copolymers of ethylene and X, that is to say those in which X is not grafted, these are copolymers of ethylene, of X and optionally of another monomer possibly being chosen from the comonomers that were mentioned above for the ethylene copolymers intended to be grafted.

Advantageously, the ethylene/maleic anhydride and ethylene/alkyl (meth)acrylate/maleic anhydride copolymers are used. These copolymers comprise from 0.2 to 10% by weight of maleic anhydride, from 0 to 40% and preferably 5 to 40% by weight of alkyl (meth)acrylate. Their MFI is between 5 and 100 (measured at 190° C. under a load of 2.16 kg). The alkyl (meth)acrylates have already been described above. The melting point is between 60 and 120° C.

Advantageously, there are on average at least 2 mol of X per chain attached to the polyolefin backbone and preferably from 2 to 5. A person skilled in the art may easily determine the number of these X moles by FTIR analysis. For example, if X is maleic anhydride and the polyolefin backbone has a weight-average molecular weight $M_w$=95 000 g/mol, it has been found that this would correspond to an amount of anhydride of at least 1.5%, preferably from 2.5 to 4%, by weight of the whole polyolefin backbone containing X. These values associated with the weight of the amine-terminated polyamides determine the amount of polyamide and of backbone in the polyamide-block graft copolymer.

Regarding the amine-terminated polyamide, the term "polyamide" is understood to mean the condensation products of:
  one or more amino acids, such as aminocaproic, 7-aminoheptanoic, 11-aminoundecanoic and 12-aminododecanoic acids with one or more lactams such as caprolactam, oenantholactam and lauryl lactam;
  one or more salts or mixtures of diamines such as hexamethylenediamine, nonamethylenediamine, decamethylenediamine (or 1,10-decanediamine), dodecamethylenediamine, meta-xylylenediamine, bis(p-aminocyclohexyl)methane and trimethylhexamethylenediamine with diacids such as isophthalic, terephthalic, adipic, azeleic, suberic, sebacic and dodecanedicarboxylic acids; or
  blends of several monomers that result in copolyamides.

Blends of polyamides may be used. Advantageously PA-6, PA-11, PA-12, the copolyamide having 6 units and 11 units (PA-6/11), the copolyamide having 6 units and 12 units (PA-6/12) and the copolyamide based on caprolactam, hexamethylenediamine and adipic acid (PA-6/6,6) are used. The advantage of the copolyamides is that it is thus possible to choose the melting point of the grafts.

The degree of polymerization may vary by large amounts, depending on its value it is a polyamide or a polyamide oligomer. In the remainder of the text either one of the two expressions will be used for the grafts.

So that the polyamide has a monoamine termination, it is sufficient to use a chain stopper of formula:

in which:
$R_1$ is hydrogen or a linear or branched alkyl group containing up to 20 carbon atoms; and
$R_2$ is a linear or branched, alkyl or alkenyl group having up to 20 carbon atoms, a saturated or unsaturated cycloaliphatic radical, an aromatic radical or a combination of the above.
The stopper may be, for example, laurylamine or oleylamine.

Advantageously, the amine-terminated polyamide has a molecular weight between 1000 and 5000 g/mol and preferably between 2000 and 4000.

The preferred amino acid or lactam monomers for the synthesis of the monoamine oligomer according to the invention are chosen from caprolactam, 11-aminoundecanoic acid or dodecalactam. The preferred monofunctional polymerization stoppers are laurylamine and oleylamine.

The polycondensation defined above is carried out according to commonly known methods, for example at a temperature generally between 200 and 300° C., under vacuum or in an inert atmosphere, with stirring of the reaction mixture. The average chain length of the oligomer is determined by the initial molar ratio of the polycondensable monomer or the lactam to the monofunctional polymerization stopper. To calculate the average chain length, one molecule of chain stopper is usually counted per one oligomer chain.

The addition of the polyamide monoamine oligomer to the polyolefin backbone containing X is carried out by reaction of one amine functional group of the oligomer with X. Advantageously X bears an anhydride or acid functional group, thus amide or imide bonds are created.

The addition of the amine-terminated oligomer to the polyolefin backbone containing X is preferably carried out in the melt state. Thus the oligomer and the backbone can be kneaded, in an extruder, at a temperature generally between 230 and 280° C. The average residence time of the molten material in the extruder may be between 15 seconds and 5 minutes, and preferably between 1 and 3 minutes. The efficiency of this addition is evaluated by selective extraction of the free polyamide oligomers, that is to say those that have not reacted to form the final polyamide-block graft copolymer.

The preparation of such amine-terminated polyamides and also their addition to a polyolefin backbone containing X is described in Patents U.S. Pat. No. 3,976,720, U.S. Pat. No. 3,963,799, U.S. Pat. No. 5,342,886 and FR 2 291 225.

The graft copolymers having polyamide blocks used in the thermoplastic compositions according to the present invention are characterized by a nanostructured arrangement with polyamide lamellae having a thickness between 10 and 50 nanometres.

These copolymers have very good creep resistance at temperatures at least equal to 80° C. and possibly ranging up to 130° C., that is to say that they do not break under 25 kPa.

The graft copolymers used in the invention may be prepared by melt-blending in extruders (single-screw or twin-screw), Buss kneaders, Brabender mixers and, in general, the usual devices for blending thermoplastics, and preferably in twin-screw extruders.

They may be prepared in one step in an extruder. In the first zones, the backbone containing X (for example an ethylene/alkyl (meth)acrylate/maleic anhydride copolymer) and the amine-terminated polyamide are introduced, then, several zones later, the additives are introduced. It is also possible to introduce all the ingredients into the first zone of the extruder.

Regarding the ethylenic polymer (C) this is advantageously polyethylene which may be a blend of several polymers, and comprise at least 50% and preferably 75% (in moles) of ethylene, its density is less than 0.960 g/cm³, and is preferably between 0.850 and 0.915 g/cm³. The MFI (melt flow index at 190° C./2.16 kg) is advantageously between 1 and 1000 g/10 min.

As examples of polyethylenes, mention may be made of:
  low density polyethylene (LDPE);
  linear low density polyethylene (LLDPE);
  very low density polyethylene (VLDPE);
  polyethylene obtained by metallocene catalysis (mPE), such as in particular the ethylene-1-octene copolymer;
  EPR (ethylene-propylene rubber) elastomers;
  EPDM (ethylene-propylene-diene monomer) elastomers;
  blends of polyethylene with an EPR or an EPDM;
  ethylene/alkyl (meth)acrylate copolymers possibly containing up to 60% by weight of (meth)acrylate and preferably 2 to 40%, the alkyl groups possibly having up to 24 carbon atoms, examples of alkyl acrylates or methacrylates are especially methyl methacrylate, ethyl acrylate, n-butyl acrylate, isobutyl acrylate, and 2-ethylhexyl acrylate; and
  ethylene/vinylacetate or vinylpropionate copolymers.

Preferably, use will be made of polyethylenes of very low density, in particular having a density between 0.850 and 0.870 g/cm³.

The thermoplastic compositions used according to the invention may also comprise processing aids such as silica, ethylenebisamide, calcium stearate or magnesium stearate.

They may also comprise heat stabilizers, antioxidants, UV stabilizers, mineral fillers and colouring pigments.

DESCRIPTION OF EXEMPLARY EMBODIMENTS OF THE GRAFT COPOLYMER (B) OF THE INVENTION

Four thermoplastic compositions A1, B1, C1 and D1, being in the form of a co-continuous nanostructured blend, were produced from the following components, the contents of which, in parts by weight, are given in Table 1 below:

TABLE 1

|  | A1 | B1 | C1 | D1 |
|---|---|---|---|---|
| LOTADER 4700 | 80 | | | |
| LOTADER 7500 | | 80 | | |
| LOTADER 3210 | | | 80 | |
| LOTADER 3410 | | | | 80 |
| Mono-NH$_2$ PA-6 | 19 | 19 | 19 | 19.6 |
| Irgafos 168 | 0.5 | 0.5 | 0.5 | 0.2 |
| Irganox 1098 | 0.5 | 0.5 | 0.5 | 0.2 |

LOTADER 4700 ® from Arkema is an ethylene/ethyl acrylate (29 wt %)/maleic anhydride (1.5 wt %) terpolymer having an MFI of 7 (g/10 min measured at 190° C. under a load of 2.16 kg, according to the standard ASTM D 1238).
LOTADER 7500 ® from Arkema is an ethylene/ethyl acrylate (17.5 wt %)/maleic anhydride (2.9 wt %) terpolymer having an MFI of 70.
LOTADER 3210 ® from Arkema is an ethylene/butyl acrylate (6 wt %)/maleic anhydride (3 wt %) terpolymer having an MFI of 5.
LOTADER 3410 ® from Arkema is an ethylene/butyl acrylate (18 wt %)/maleic anhydride (3 wt %) terpolymer having an MFI of 5.
The mono-NH$_2$-terminated PA-6 has a molecular weight of 2500 g/mol.
IRGANOX 1098 is an antioxidant from CIBA.
IRGAFOS 168 is a stabilizer from CIBA.

These components were introduced into a LEISTRITZ® LSM 306-34 co-rotating twin-screw extruder having a temperature profile between 240 and 280° C., the product obtained being bagged after granulation.

EXAMPLES

Implementation of the tests: blending of PA-6, of graft copolymer (B) and of low-density PE by compounding.

The compositions were obtained by compounding on a WERNER 30, L/D 30 twin-screw extruder equipped with a venting system and with a die-face cutter, with a throughput of 20 kg/h and a speed of 200 rpm. The temperatures used were as follows: 270/270/270/270/270/270° C.

The components in granule form were dry blended then introduced into the feed hopper.

Moulding of these Samples:

The granules were dried under reduced pressure at a temperature of 80° C. then were injection moulded on an injection moulding machine of Krauss Maffei B1 type (clamping: 60 t) under the following conditions:

to Material temperature: 240-260° C., mould temperature: 40° C.-injection pressure: 1100 bar The standardized test specimens (80×10×4 mm$^3$) thus obtained were conditioned for 14 days to 23° C. and 50% relative humidity.

Evaluation:

Head pressure of the extruder (P head): this value expressed in bar, gives an indication of the melt viscosity of the compound, if the pressure is low the same is true of the viscosity.

Impact strength on pre-notched test specimens of the CHARPY type according to ISO Standard 179-82, at various temperatures (23° C. and −40° C.).

Melt flow index MFI according to ISO Standard 1133 under a load of 2.16 kg and at a temperature of 235° C. for the compositions based on PA-6.

Raw Materials:

The polyamides tested were the polyamides PA-6 sold by Domamid under the reference Domo 27.

The graft copolymer (B) according to the invention was the composition D1 above.

The Ethylenic Polymers Tested were:

Exxelor VA 1801° sold by Exxon: MAH (maleic anhydride) grafted ethylene-propylene rubber (EPR), having a density d=0.87 g/cm$^3$.

Exxelor VA 1803® sold by Exxon: MAH (maleic anhydride) grafted ethylene-propylene copolymer, having a density d=0.86 g/cm$^3$.

Exxelor VA 1840® sold by Exxon: MAH (maleic anhydride) grafted ethylene-octene copolymer, having a density d=0.88 g/cm$^3$.

Fusabond MN493D® sold by DuPont: MAH (maleic anhydride) grafted ethylene-octene copolymer, having a density d=0.87 g/cm$^3$.

Engage 8200® sold by Dow-DuPont: metallocene polyethylene having a density d=0.87 g/cm$^3$.

Another impact modifier tested: Lotader 3410® by Arkema, which is an ethylene/butylacrylate (18 wt %)/maleic anhydride (3 wt %) terpolymer, having an MFI of 5.

Test Results:

The results obtained with the various compositions based on a PA-6 resin (80% by weight of the blend) are collated in Table 2 (Examples 1 to 5, 7 and 8 being comparative).

TABLE 2

| TEST | 1 | 2 | 3 | 4 | 5 | 6 | 7 | 8 |
|---|---|---|---|---|---|---|---|---|
| Impact modifier | 20% VA1801 | 20% VA1803 | 20% VA1840 | 20% Fusabond MN493D | 6% Lotader 3410 14% Engage 8200 | 6% compos. D1 14% Engage 8200 | 20% Lotader 3410 | 20% Lotader 4700 |
| P head (bar) | 17 | 14 | 15 | 17 | 15 | 14 | 20 | 15 |
| MFI (235° C., 2.16 kg) | 5.4 | 7.1 | 6.5 | 5.8 | 5.3 | 8.7 | 1.5 | 5 |
| Notched Charpy impact at 23° C. (kJ/m$^2$) | 84 | 88 | 87 | 99 | 85 | 78 | 33 | 47 |

TABLE 2-continued

| TEST | 1 | 2 | 3 | 4 | 5 | 6 | 7 | 8 |
|---|---|---|---|---|---|---|---|---|
| Notched Charpy impact at −40° C. (kJ/m$^2$) | 14.8 | 22 | 17.6 | 25 | 17 | 25 | 10.5 | 10 |

It is observed that these compositions based on PA-6 and on a blend of the polyamide-block graft copolymer and on the low-density polyethylene have an impact strength/melt flow compromise that is substantially improved compared to the other impact modifiers, at low temperature, in particular at −40° C.

This is all the more surprising since the impact modifier used for our invention does not contain reactive functional groups. It is these that generally permit good impact properties. By comparing the examples from Table 2, it is observed that the blend of our invention (test 6) makes it possible to obtain impact properties at 23° C. that are equivalent to the impact-modified polyamide compositions generally used. At low temperature, the impact modifier used in our invention is even more effective in the polyamide than those generally used (+47% in the notched Charpy impact at −40° C. compared to the composition from the equivalent reactive test 5).

Furthermore, the polyamide/impact modifier combination of our invention has a greater melt flow than the other impact resistant polyamide formulations (higher MFI and lower P head).

The invention claimed is:

1. Composition based on an impact-resistant polyamide thermoplastic resin, comprising, as a blend:
   from 60 to 98% by weight of polyamide resin (A) and
   from 2 to 40% by weight of a blend of at least one polyamide grafted ethylene copolymer (B) composed of a polyolefin backbone and of at least one polyamide graft in which the grafts are attached to the backbone by the residues of an unsaturated monomer (X) having a functional group capable of reacting with an amine-terminated polyamide, the residues of the unsaturated monomer (X) being attached to the backbone by grafting or copolymerization via its double bond, and of a non-reactive ethylenic polymer (C) that is miscible with (B), has a density of 0.87 g/cm$^3$ or less and comprises at least 50 mole percent of ethylene.

2. Composition according to claim 1, wherein the percentage by weight of the copolymer (B) in the blend between the copolymers (B) and (C) is between 10 and 99%.

3. Composition according to claim 1, wherein the polyolefin backbone containing X of the copolymer (B) is chosen from the group consisting of ethylene/maleic anhydride and ethylene/alkyl (meth)acrylate/maleic anhydride copolymers.

4. Composition according to claim 1, wherein the polyamide grafts of the copolymer (B) are mono-NH$_2$-terminated PA-6 polyamide or mono-NH$_2$-terminated PA-11 polyamide or mono-NH$_2$-terminated PA-6/11 copolyamide.

5. Composition according to claim 4, wherein the polyamide grafts have a molar mass between 1000 and 5000 g/mol.

6. The composition of claim 5, wherein the polyamide grafts have a molar mass between 2000 and 4000 g/mol.

7. Composition according to claim 1, wherein the ethylenic polymer (C) is chosen from the group consisting of linear low density polyethylene (LLDPE), very low density polyethylene (VLDPE), polyethylene obtained by metallocene catalysis (mPE), ethylene/1-octene copolymer, ethylene-propylene-rubber (EPR) elastomers, ethylene-propylene-diene monomer (EPDM) elastomers, ethylene/alkyl (meth)acrylate copolymers, ethylene/vinylacetate copolymers, and a blend of at least two of these polymers.

8. Composition according to claim 7, wherein the ethylenic polymer (C) has a density between 0.850 and 0.870 g/cm$^3$.

9. The composition of claim 1 comprising an injection molded or extruded article.

10. Composition according to claim 1, wherein the non-reactive ethylenic polymer (C) has a density of less than 0.87 g/cm$^3$.

11. Method of obtaining a composition based on an impact-resistant polyamide thermoplastic resin, comprising the steps of:
    manufacturing a polyamide grafted ethylene copolymer (B), by reactive extrusion starting from a polymer chosen from the group consisting of ethylene/maleic anhydride and ethylene/alkyl (meth)acrylate/maleic anhydride copolymers, and from mono NH$_2$-terminated polyamide;
    blending said copolymer (B), the polyamide PA resin, and the ethylenic polymer (C) in an extruder,
    wherein said composition comprises as a blend:
      from 60 to 98% by weight of polyamide resin (A) and
      from 2 to 40% by weight of a blend of the polyamide grafted ethylene copolymer (B) and of a non-reactive ethylenic polymer (C) that is miscible with (B), has a density of 0.87 g/cm$^3$ or less, and comprises at least 50 mole percent ethylene.

12. Method according to claim 11, wherein the non-reactive ethylenic polymer (C) has a density of less than 0.87 g/cm$^3$.

* * * * *